(12) United States Patent
Torino et al.

(10) Patent No.: US 9,003,922 B2
(45) Date of Patent: Apr. 14, 2015

(54) QUICK RELEASE COUPLING FOR THE CRANK OF A BICYCLE DRIVE TRAIN

(71) Applicants: Kenneth Torino, Colchester, VT (US); David-Henry Oliver, Watertown, MA (US)

(72) Inventors: Kenneth Torino, Colchester, VT (US); David-Henry Oliver, Watertown, MA (US)

(73) Assignee: K-Tor LLC

( * ) Notice: Subject to any disclaimer, the term of this patent is extended or adjusted under 35 U.S.C. 154(b) by 100 days.

(21) Appl. No.: 13/965,573

(22) Filed: Aug. 13, 2013

(65) Prior Publication Data

US 2015/0047460 A1    Feb. 19, 2015

(51) Int. Cl.
   *B62M 3/00* (2006.01)
   *B62M 3/16* (2006.01)

(52) U.S. Cl.
   CPC ...................................... *B62M 3/16* (2013.01)

(58) Field of Classification Search
   USPC .............. 74/594.1, 594.2, 594.4; 403/92, 321
   See application file for complete search history.

(56) References Cited

U.S. PATENT DOCUMENTS

| | | | |
|---|---|---|---|
| 634,256 A * | 10/1899 | Atherton | 74/594.2 |
| 3,648,542 A * | 3/1972 | Perotti et al. | 74/594.1 |
| 4,171,822 A | 10/1979 | Thun | |
| 4,201,120 A * | 5/1980 | Segawa | 74/594.2 |
| 5,060,537 A | 10/1991 | Nagano | |
| 5,203,229 A | 4/1993 | Chen | |
| 5,363,721 A * | 11/1994 | Hsiao | 74/594.1 |
| 5,586,472 A | 12/1996 | Lin | |
| 5,718,028 A * | 2/1998 | Hasenberg | 29/264 |
| 5,974,644 A * | 11/1999 | Neinast | 29/267 |
| 6,477,917 B1 | 11/2002 | Peyre et al. | |
| 6,708,998 B1 | 3/2004 | Blake | |
| 6,968,754 B2 | 11/2005 | Bandarra | |
| 7,104,158 B2 | 9/2006 | Harrington | |
| 7,350,796 B2 | 4/2008 | Misevski | |
| 7,721,391 B2 * | 5/2010 | Bukovitz et al. | 16/429 |
| 8,061,236 B2 | 11/2011 | French | |
| 2003/0188602 A1 | 10/2003 | Lubanski | |
| 2009/0205462 A1 | 8/2009 | Harrington | |

* cited by examiner

*Primary Examiner* — Vicky Johnson
(74) *Attorney, Agent, or Firm* — H. Jay Spiegel

(57) ABSTRACT

A quick release coupling is incorporated into the drive train of the bicycle to couple the crank to the drive shaft. It includes an axle with a flat keyway facilitating installation. A crank arm has an opening matching the circumference of the shaft other than at the flat area. The opening includes a protrusion engaging the keyway to transmit torque. A land is near an end of the shaft. Each coupling has an opening similar to the opening through each crank arm. The orientation of the coupling is with the flat region aligned with the keyway. In this orientation, the coupling is slid over the end of the shaft until the flat area is aligned over the land. The coupling may be rotated until the flat area is misaligned with the keyway and within the land. In this position, the crank arm is locked.

26 Claims, 8 Drawing Sheets

FIG 5

UNLOCKED

SECTION C-C

QUICK RELEASE COUPLING FOR THE CRANK OF A BICYCLE DRIVE TRAIN

BACKGROUND OF THE INVENTION

The present invention relates to a quick release coupling for the crank of a bicycle drive train. Bicycles of a variety of sizes, styles and structures are abundant and extremely well known. Such bicycles have numerous ways of assembling their component parts.

In the ownership of a bicycle, it is often necessary and desirable to be able to quickly disassemble and assemble component parts, not only to change or upgrade individual component parts, but for purposes of cleaning, oiling, greasing and other maintenance.

In a bicycle, the standard means of propulsion consists of a front sprocket coupled to a rear sprocket by a closed loop chain. The front sprocket typically includes an axle coupled thereto to which opposed crank arms are assembled, with the crank arm on one side being displaced 180° with respect to the orientation of the other crank. At the respective ends of the cranks, pedals are mounted.

Over the course of use of a bicycle, if the owner does not keep up with the maintenance, it is often the case that interconnected component parts become more and more difficult to disassemble for maintenance purposes. Additionally, even if the bicycle is properly maintained, it is often advantageous to be able to quickly and efficiently disassemble parts for maintenance, as well as for storage and repair purposes.

There is a need for an easy means for assembling and disassembling the crank with respect to the front sprocket and its axle. For such a means to be effective and advantageous, it must best facilitate the transfer of force from the pedals of the bicycle to the front sprocket. In other words, the coupling between the crank arm and the front sprocket must be such that the transfer of force is steady and secure. It is with these needs in mind that the present invention was developed. It is also noted that the inventive quick release coupling is useful in releasably coupling any crank to a shaft.

Applicant is aware of the following prior art:
U.S. Pat. No. 4,171,822 to Thun
U.S. Pat. No. 5,060,537 to Nagano
U.S. Pat. No. 5,203,229 to Chen
U.S. Pat. No. 5,586,472 to Lin
U.S. Pat. No. 6,477,917 to Peyre et al.
U.S. Pat. No. 6,708,998 to Blake
U.S. Pat. No. 6,968,754 to Bandarra
U.S. Pat. No. 7,104,158 to Harrington
U.S. Pat. No. 7,350,796 to Misevski
U.S. Pat. No. 8,061,236 to French
U.S. Published Application No. 2003/0188602 to Lubanski
U.S. Published Application No. 2009/0205462 to Harrington.

Of the above-listed prior art, Thun discloses an attachment between a crank and an axle consisting of an elongated rod having an irregular cross-section which is rotated to couple the crank to the axle. Nagano teaches a locking mechanism to attach a pedal to a crank that includes a rotating cam. The other references include attachment means including set screws, threaded fasteners, hexagonal cross-section shafts, spring biased pins, and other fastening means. The present invention differs from the teachings of all of these prior art references as contemplating an attachment means which includes a crank shaft of circular cross-section with a keyway machined therein to allow torque transfer between the shaft and a crank having an opening with a tab designed to couple with the keyway, and a bayonet-type lock that employs the keyway to align itself with a thrust locking groove and the ability to rotate to a locked position, whereupon a screw or other threaded fastener may be employed to lock the bayonet lock in the locked position to maintain the crank on the drive shaft.

SUMMARY OF THE INVENTION

The present invention relates to a quick release coupling incorporated into the drive train of the bicycle for coupling the crank to the drive shaft. The present invention includes the following interrelated objects, aspects and features:

(1) In a first aspect, the drive train includes the structure of an axle or shaft that extends through an opening in the bicycle frame. The axle or shaft has an elongated keyway consisting of a flat area extending completely along the length of the axle or shaft. The flat area on the shaft is provided not only to transfer torque from movements of the bicycle pedals by the rider, but also to facilitate installation and removal of the quick release mechanism of the present invention.

(2) The shaft is intended to receive at its opposed ends cranks having crank arms that couple to the shaft at one end and have respective pedals attached thereto at the other end. At the end of each crank arm that will be releasably attached to the shaft, an opening or hole therethrough is provided. The opening has a portion of circular cross-section that subtends most of the circumference thereof and matches the circumference of the shaft other than at the flat area comprising the keyway. Corresponding to the keyway, the opening through the crank arm includes a radially inwardly protruding portion that has a radially inward flat area that is intended to engage the keyway so that rotations of the crank arm firmly transmit torque to the axle or shaft. The flat areas within the openings in the crank arms are arranged with respect to the keyway so that when the crank arms are assembled to the shaft, they are displaced with respect to one another by 180° so that they extend in opposite directions with respect to the shaft.

(3) The shaft has an axis of elongation. Near to each end of the shaft but slightly spaced therefrom, an annular land is provided. The walls of the land toward the middle of the shaft and toward each end of the shaft, respectively, are ring-like in configuration with the exception of the location where they intersect the keyway or flattened area where they are flattened as well. As should be understood, based upon the width of the bicycle frame at the location where the shaft extends therethrough, the ends of the shaft are sufficiently long enough so that when the crank arms are installed thereover, the outboard surfaces of the crank arms are slightly inboard of the lands.

(4) The quick release coupling mechanism of the present invention is utilized to releasably install each crank arm on the shaft. The operation of the couplings is identical. Each coupling has an opening similar to the opening through each crank arm. These openings consist of a part circular portion and a radially inwardly protruding portion having an inner flat surface matching the surface of the keyway. Each coupling member also includes an arcuate slot extending a fraction of the distance about the circumference of the coupling. In this regard, preferably, radially outward of the opening through the crank arm, a threaded hole is provided.

(5) To releasably lock a crank arm onto the shaft, the rotative orientation of the coupling is adjusted so that the flat region of the opening is aligned with the keyway. In this orientation, the coupling may be slid over the end of the shaft until the flat area is aligned over the land. In this position, the coupling may be rotated a small distance until the flat area within the opening of the coupling is misaligned with the keyway and within the land. In this position, the crank arm is locked in assembled position on the shaft.

(6) The coupling is rotated with respect to the shaft until a threaded hole in the crank is aligned with the arcuate slot on the coupling. A latch device is assembled to the coupling. The latch device has two legs meeting at a central hub. The central hub is received in the arcuate slot and has a hole to receive a threaded fastener. A first leg includes a distal tang received in a groove on the crank arm of the pedal. A second leg has a distal tang engaging the periphery of the coupling. With the latch device installed, a threaded fastener with an enlarged head may be extended through the hole of the hub and threaded into the threaded hole in the crank to lock the rotative position of the coupling with respect to the crank arm and shaft. The same operation is conducted for each crank arm to releasably assemble them to the shaft. The latch device prevents the screw from backing out of the threaded hole.

(7) In order to easily and quickly remove the crank arms from the shaft, all that must be done is to remove the threaded fastener from the latch device, rotate the coupling, and pull it off the axle or shaft. This operation can be carried out in a few seconds. As will be described in greater detail later, the threaded fastener can be replaced with an ordinary machine screw or a plastic clip.

Accordingly, it is a first object of the present invention to provide a quick release bicycle crank coupling.

It is a further object of the present invention to provide such a coupling in which crank arms are assembled to a shaft and couplings are assembled outboard of the crank arms and locked in place using latch devices and threaded fasteners.

It is a further object of the present invention to provide such a coupling in which an arcuate opening allows securement of a threaded fastener within a latch device hole and crank hole to retain the coupling in mounted position.

It is a still further object of the present invention to provide such a coupling which may be easily and quickly assembled while crank arms include structure interacting with a shaft to allow firm and efficient transfer of torque from pedaling actions of a rider to the bicycle sprockets.

These and other objects, aspects and features of the present invention will be better understood from the following detailed description of the preferred embodiments when read in conjunction with the appended drawing figures.

SPECIFIC DESCRIPTION OF THE PREFERRED EMBODIMENT

Figure 1:
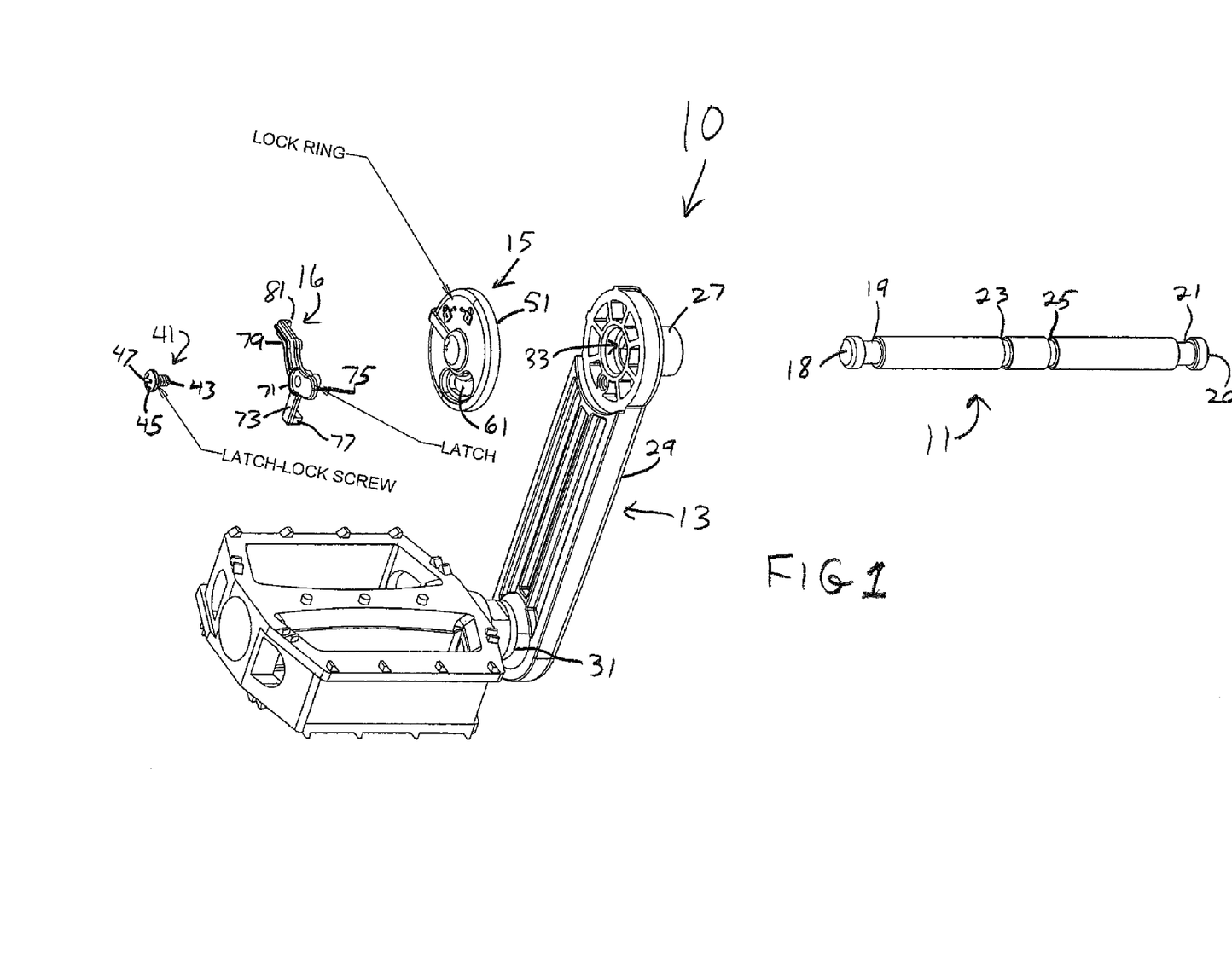
FIG. 1 shows an exploded perspective view of the main structures of the present invention.
Figure 2:
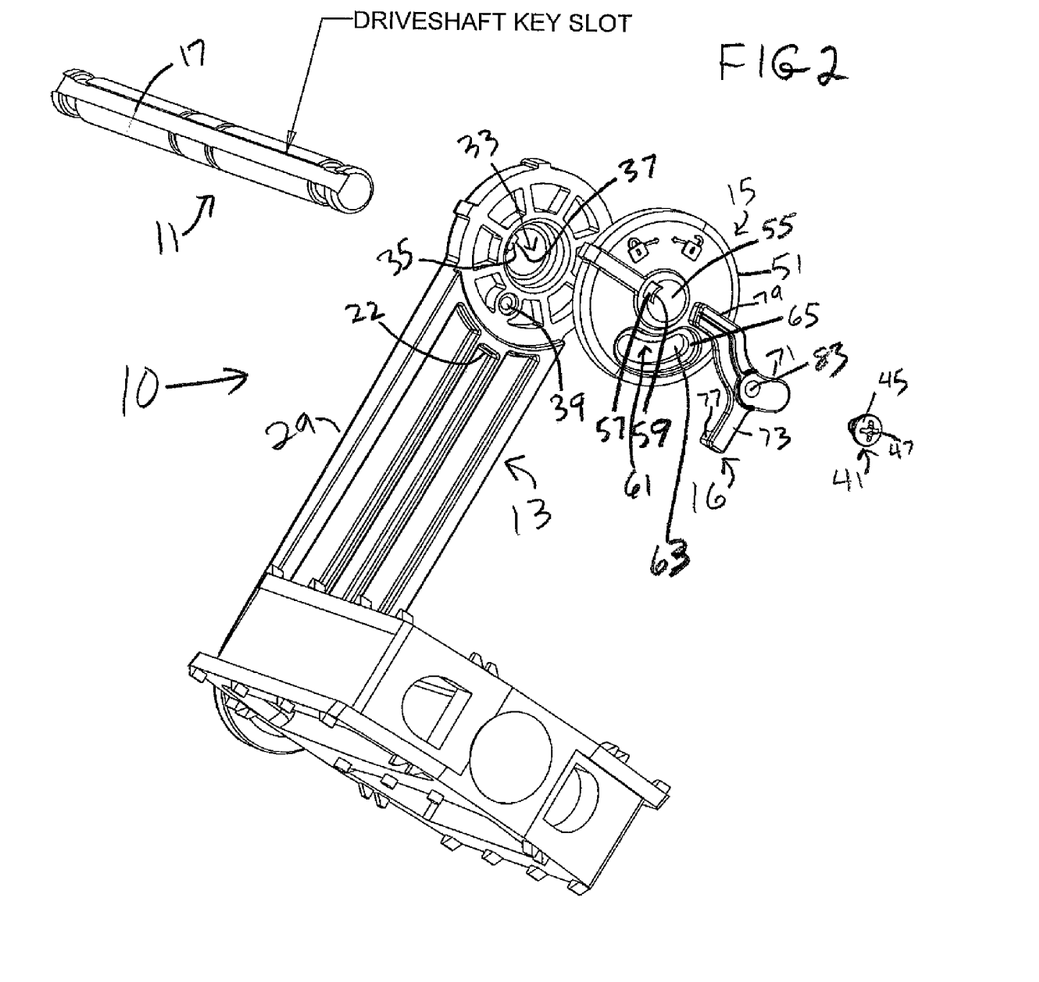
FIG. 2 shows a further exploded perspective view of the main features of the present invention.

With reference to the figures, the present invention, a drive train for a bicycle, is generally designated by the reference numeral 10 and is seen to include an axle or shaft 11, a crank 13, a coupling or locking mechanism 15 and a latch device 16 with a locking screw 41 (FIGS. 1 and 2 in particular).

With particular reference to FIGS. 1 and 2, the axle or shaft 11 has an axis of elongation as well as a flattened area or keyway 17 (FIG. 2) extending throughout is length and comprising a keyway. Annular lands 19 and 21 are slightly inward from the respective ends 18 and 20 of the shaft 11, and additional lands 23 and 25 are provided to receive set screws or other fastening means intended to facilitate attachment of one or more gears (not shown) to the shaft 11.

With reference to FIG. 1, the crank 13 includes a hub 27 as well as a crank arm 29 that is elongated and has, at its end distal from the hub 27, a hole 31 provided to allow installation of a pedal in a manner well understood by those skilled in the art. The crank arm has an elongated groove 22 for a purpose to be described in greater detail hereinafter.

With further reference to FIGS. 1 and 2, the hub 27 and crank arm 29 have a hole 33 therethrough that is circular in configuration except for a radially inwardly directed protrusion 35 (FIG. 2) subtending a small portion of the circumference of the hole 33, and having an inwardly facing flat surface 37. The flat surface 37 is sized and configured to engage the keyway 17 of the shaft 11 to facilitate torque transfer between the crank 13 and the shaft 11.

With particular reference to FIGS. 1 and 2, the crank 13 has a threaded hole 39 that threadably receives the fastener 41 having a threaded shaft 43 and an enlarged head 45 with a tool receiving recess 47 (FIGS. 1 and 2).

Figure 3:
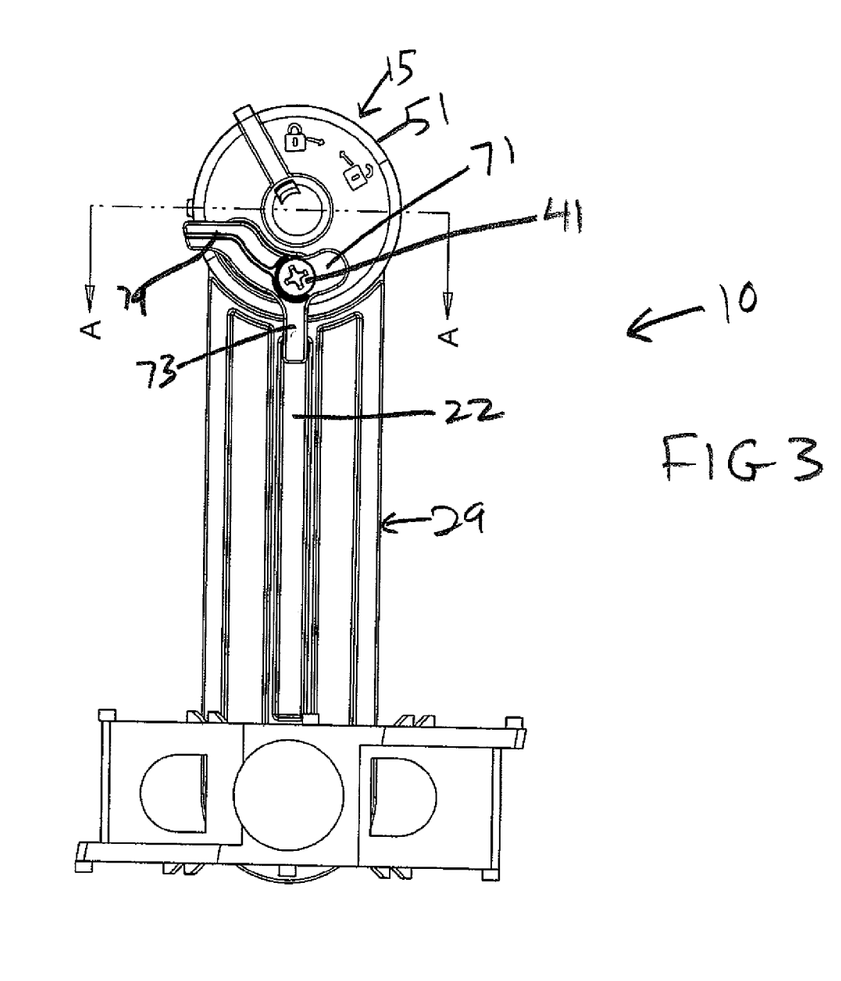
FIG. 3 shows a front view of the crank of the present invention as assembled.
Figure 5:
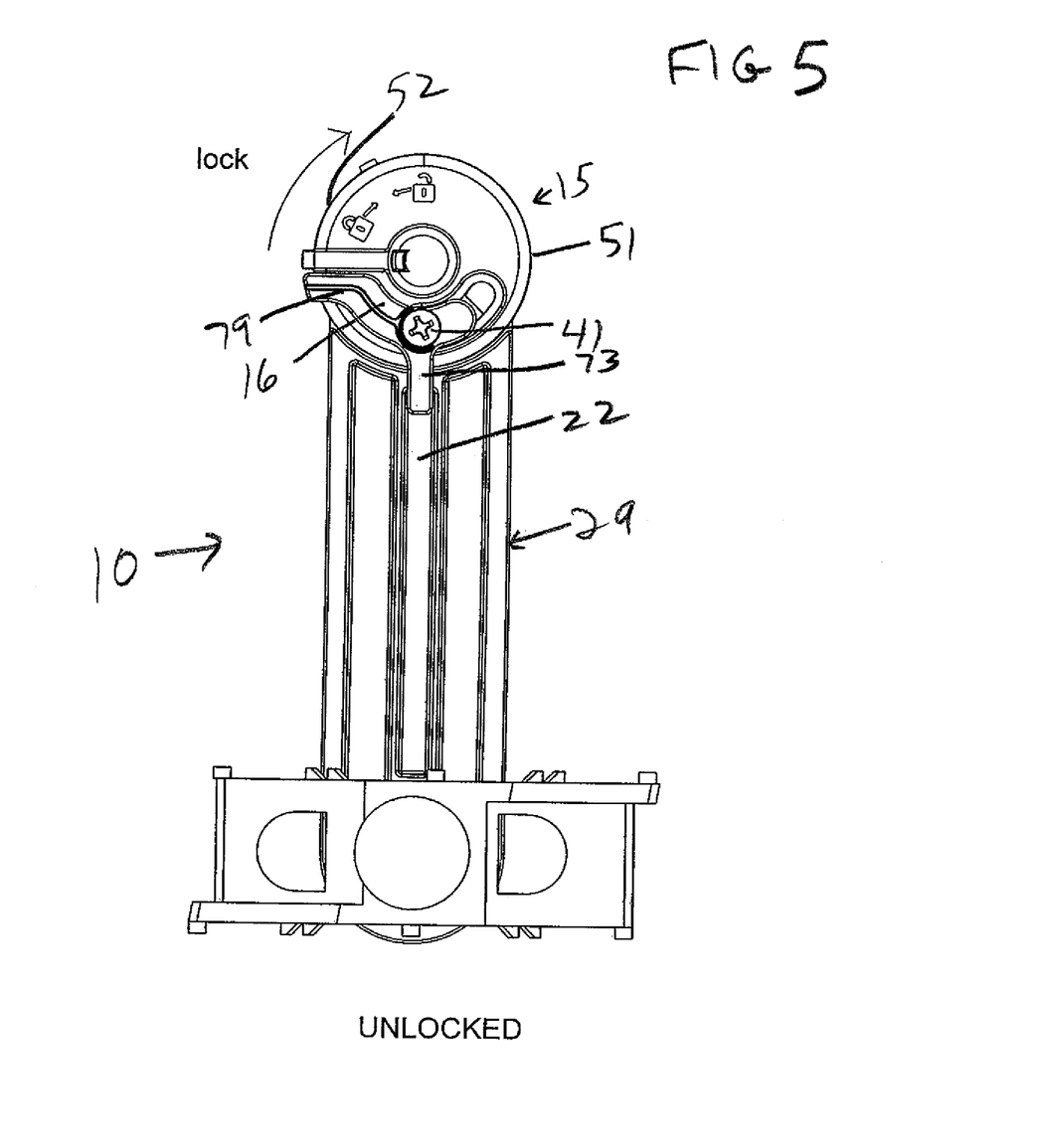
FIG. 5 shows a front view of the present invention with the coupling unlocked.
Figure 6:
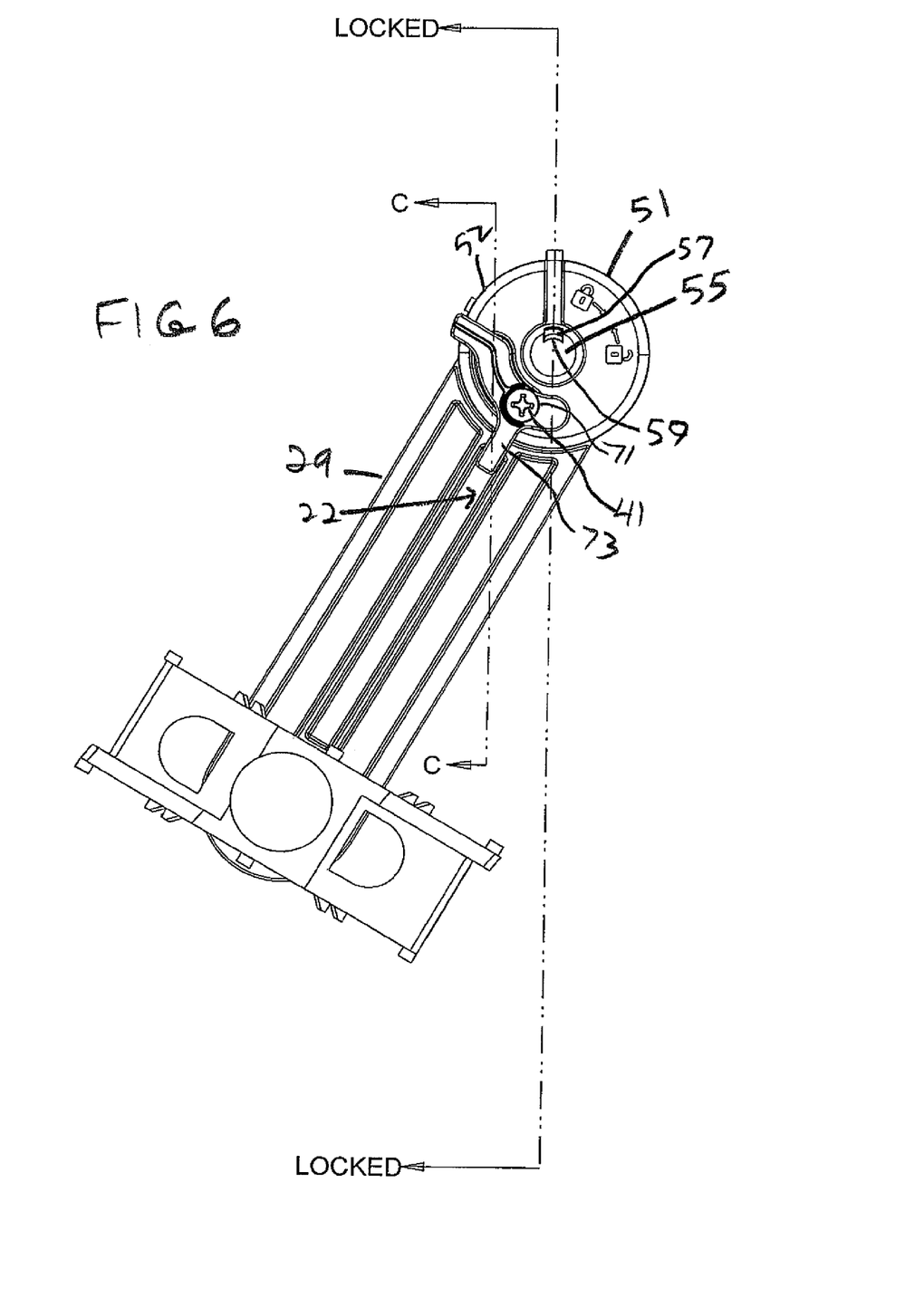
FIG. 6 shows a front view of the present invention with the coupling locked.
Figure 7:
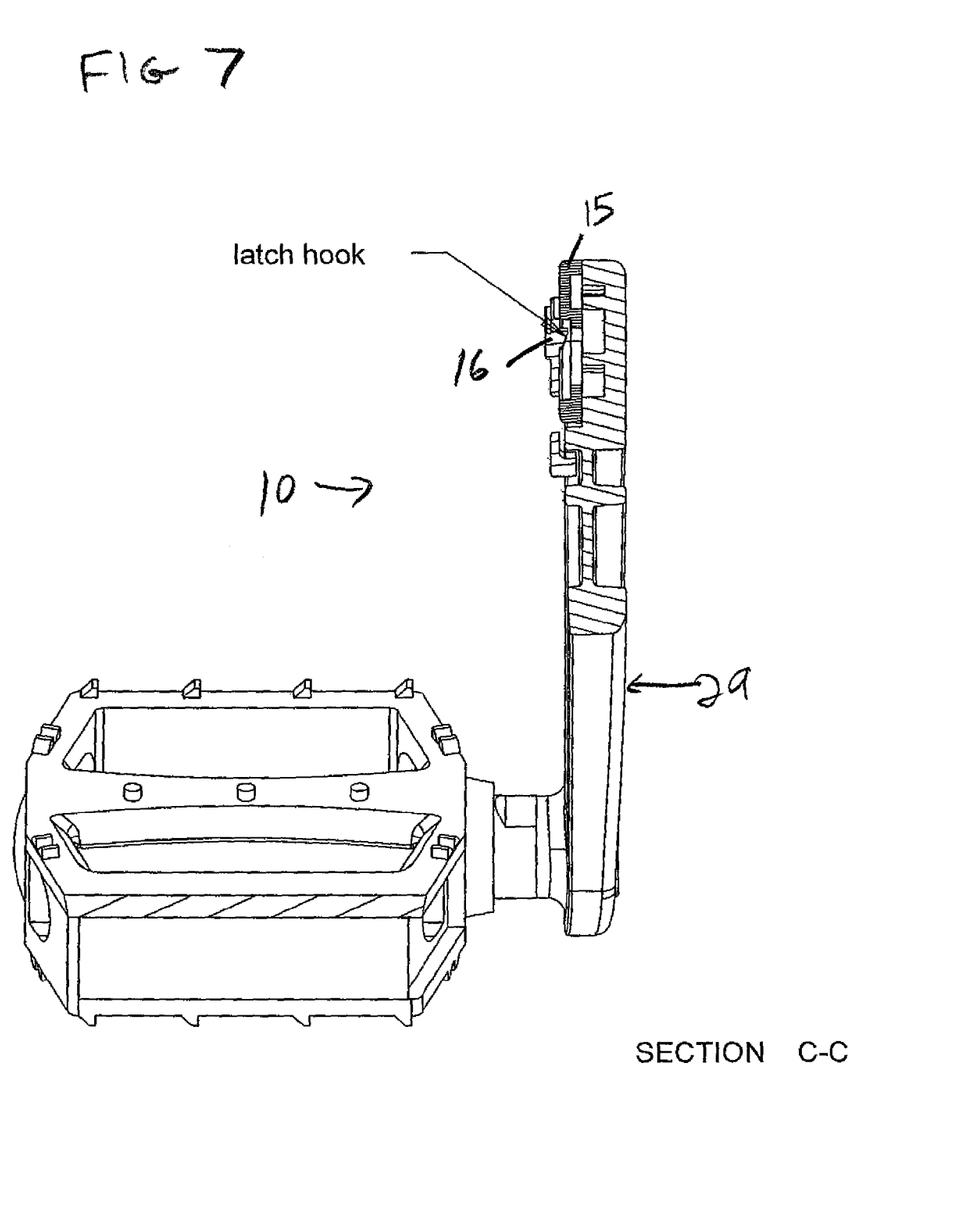
FIG. 7 shows a cross-sectional view along the line C-C of FIG. 6.
Figure 8:
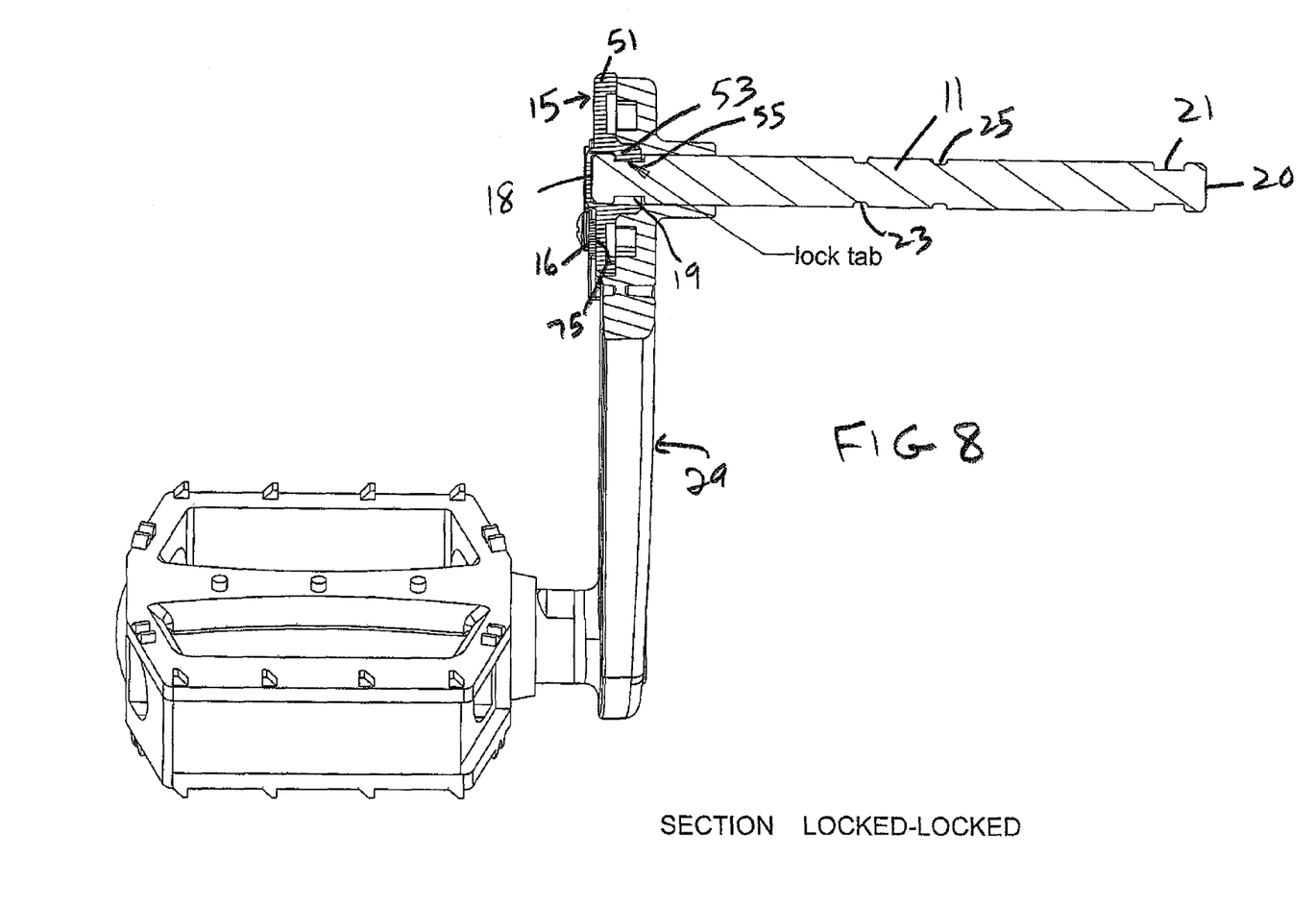
FIG. 8 shows a further cross-sectional view showing the coupling locked.

With reference in particular to FIGS. 1-2, the coupling or locking mechanism 15 includes a generally disc-like body 51 and a centrally located hub 53 (FIG. 8). The hub has a central opening 55 therethrough (FIGS. 2, 6 and 8) that also includes a radially inwardly directed protrusion 57 having an inwardly facing flat surface 59 designed to allow sliding of the coupling 15 over the keyway 17 of the shaft 11 as will be explained in greater detail hereinafter. The disc-like body 51 also includes an arcuate slot 61 (FIGS. 1 and 2) that, as seen in FIGS. 3, 5 and 6, receives therethrough the threaded fastener 41. As seen in FIG. 2, the slot has an opening 63 and a peripheral shoulder 65 that is provided to receive the underside 75 (FIG. 7) of the latch device 16 (FIGS. 5 and 8). The arcuate slot 61 subtends only a small portion of the circumference of the disc-like body 51.

With reference to FIGS. 1, 2 and 6, the latch device 16 has a central hub 71 with a peripheral shape mimicing the shape of a portion of the slot 61. The latch device 16 has a first leg 73 having an inwardly directed tang 77 received within the groove 22 of the crank arm 29 (FIG. 6). The latch device 16 has a second leg 79 having an inwardly directed tang 81 (FIG. 1) engaging the periphery 52 (FIG. 6) of the coupling 15. As seen in FIG. 6, with the hub 71 received within the arcuate groove 61, with its underside 75 engaging the shoulder 65, and with the tang 77 received within the groove 22 of the crank arm 29 and the tang 81 engaging the periphery 52 of coupling 15, the screw 41 shaft 43 goes through the hole 83 in hub 71 and the slot 61 and is threadably received in hole 39 to lock the coupling 15 in assembled position. The device 16 prevents the screw from backing out of hole 39.

Figure 4:
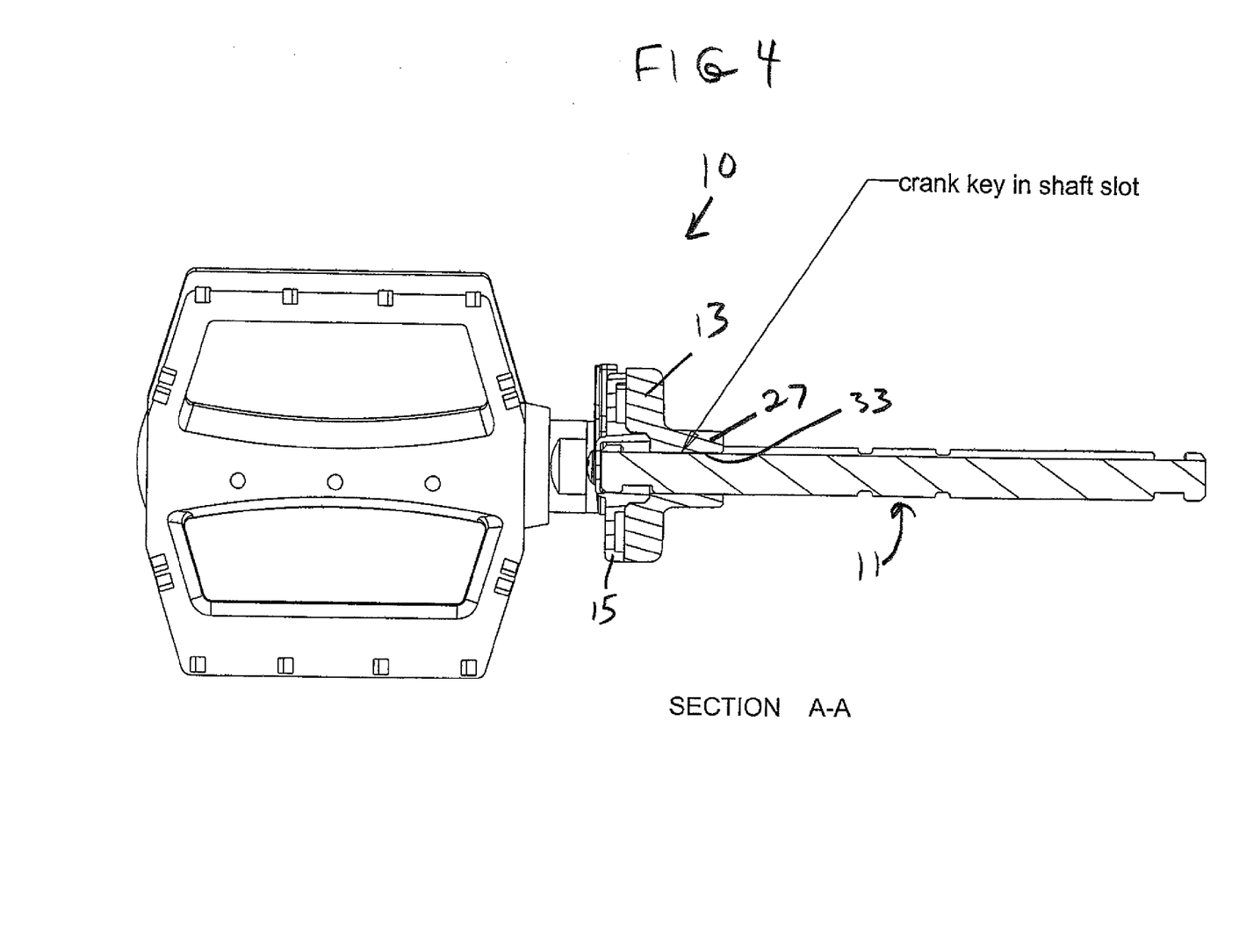
FIG. 4 shows a cross-sectional view along the line A-A of FIG. 3.

With reference to the Figures, the assembly of the crank 13 and coupling 15 over the shaft 11 will now be explained. Cranks 13 slide over the shaft 11 with their flat surfaces 37 engaging the keyway or flattened area 17 (FIGS. 2 and 4) so that torque transfer occurs between the cranks 13 and the shaft 11 when the user is pedaling the bicycle. As should be understood, the protrusions 35 and surfaces 37 of respective opposed cranks 13 are located with respect to the extension of the respective crank arms 29 thereof so that when the cranks 13 are installed over the shaft 11, the respective crank arms 29 are rotatably displaced with respect to one another by 180°, one-half the circumference of a circle.

Next, the couplings 15 are slid over the ends 18, 20 of the shaft 11 until their protrusions 57 (FIG. 6) are aligned with the respective lands 19 and 21 (FIG. 5). When this occurs, the couplings 15 are rotated to misalign the protrusions 57 with the keyway 17 of the shaft 11 (FIG. 6). Thus, the protrusions 57 are captured within the lands 19 and 21 so that the couplings 15 cannot be removed from the shaft 11 in that orientation.

The rotative position of the couplings 15 is such that the arcuate slots 61 thereof (FIG. 6) are aligned with the threaded hole 39 (FIG. 2) of the crank 13. In that orientation, the latch device 16 is assembled to the coupling 15 as shown in FIG. 6, the threaded fastener 41 (FIG. 7) is extended through the hole 83, slot 61 and the threaded shaft 43 thereof is threadably received within the threaded hole 39, with the shoulder 46 of the head 45 of the fastener 41 (FIG. 7) engaging the latch device 16 and the surface 75 of the latch device hub 71 engaging the shoulder 65 of the slot 61 (FIGS. 6 and 8) to lock the couplings 15 in mounted relation over the shaft 11 and in attached relationship with respect to the respective cranks 13. Alternatively, the opening 63 of slot 61 (FIG. 2) can have a larger width at one end (corresponding to an orientation permitting disassembly) and a smaller width at its other end. In this way, the fastener 41 can be replaced with a machine screw having a head, the width of which is slightly smaller than the larger width of the opening 63. In this way, rotation of the coupling 15 causes the periphery of the head to increasingly bind in the opening. Preferably, the fastener 41 can be a machine screw and the latch device 16 is held in the slot 61 by the screw to lock the components.

When it is desired to disassemble the cranks 13 from the shaft 11, all the user must do is remove the fasteners 41, rotate the couplings 15 so their protrusions 57 are aligned with the keyway 17, and pull the couplings 15 off the shaft 11. Thereafter, the cranks 13 may easily be slid off the shaft as well.

In the preferred embodiment of the present invention, the shaft 11, cranks 13, and couplings 15 are made of a strong lightweight metal such as, for example, aluminum. Of course, steel, crank aluminum, steel-reinforced plastic and lock plastic can also be employed. The latch device 16 is preferably made of plastic.

As such, an invention has been disclosed in terms of a preferred embodiment thereof which fulfills each and every one of the objects of the invention as set forth above, and provides a new and useful quick release bicycle crank coupling of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A drive train for a bicycle, comprising:
   a) a shaft having an axis of elongation, said shaft having an annular land spaced from an end of said shaft and a flattened area extending parallel to said axis;
   b) a crank having a hole at one end thereof, said hole having an inner periphery matching an outer periphery of said shaft, including a first protrusion engaging said flattened area of said shaft to facilitate torque transmission; and
   c) a locking mechanism having a central opening matching said outer periphery of said shaft including a second protrusion engageable with said flattened area;
   d) said crank being mounted on said shaft with said one end of said crank beyond said annular land with respect to said end of said shaft;
   e) said locking mechanism being mounted on said shaft over said land, said locking mechanism having a first rotative position in which said second protrusion is aligned with said flattened area to facilitate sliding of said locking mechanism axially along said shaft and a second rotative position in which said second protrusion is misaligned with said flattened area and located within said land to lock said locking mechanism and crank on said shaft.

2. The drive train of claim 1, wherein said shaft has a circular cross-section, besides at said flattened area.

3. The drive train of claim 1, wherein said locking mechanism is generally disc-like and includes a slot extending therethrough.

4. The drive train of claim 3, wherein said hole comprises a first hole, said crank including a second hole spaced from said first hole, said slot being aligned with said second hole in said second rotative position of said locking mechanism.

5. The drive train of claim 4, wherein said second hole is threaded.

6. The drive train of claim 5, further including a threaded fastener received through said slot and into said second hole, said threaded fastener including an enlarged head received in said slot to lock said locking mechanism in said second rotative position.

7. The drive train of claim 6, wherein said crank includes a crank arm extending perpendicularly with respect to said shaft, said crank arm including a groove.

8. The drive train of claim 7, further including a latch device received in said slot, said latch device including a third hole aligned with said slot.

9. The drive train of claim 8, further including a threaded fastener received through said third hole and said slot and threadably received in said second hole.

10. The drive train of claim 9, wherein said threaded fastener includes an enlarged head received within said latch device to lock said locking mechanism in said second rotative position thereof, said latch device preventing said fastener from rotating out of said second hole.

11. The drive train of claim 8, wherein said latch device includes a first tang received in said crank arm groove.

12. The drive train of claim 11, wherein said latch device includes a second tang engaging a peripheral surface of said crank.

13. The drive train of claim 4, further including a latch device received in said slot, said latch device including a third hole aligned with said slot.

14. The drive train of claim 13, wherein said second hole is threaded.

15. The drive train of claim 14, further including a threaded fastener received through said third hole and said slot and threadably received in said second hole.

16. The drive train of claim 15, wherein said threaded fastener includes an enlarged head received within said latch device to lock said locking mechanism in said second rotative position thereof, said latch device preventing said fastener from rotating out of said second hole.

17. A drive train for a bicycle, comprising:
   a) a shaft having an axis of elongation, said shaft having an annular land spaced from an end of said shaft and a flattened area extending parallel to said axis, said shaft having a circular cross-section, besides at said flattened area;

b) a crank having a first hole at one end thereof, said first hole having an inner periphery matching an outer periphery of said shaft, including a first protrusion engaging said flattened area of said shaft to facilitate torque transmission, said crank having a second threaded hole spaced from said first hole; and c) a disc-like locking mechanism having a central opening matching said outer periphery of said shaft including a second protrusion engageable with said flattened area and a slot therethrough aligned with said second hole in said second rotative position of said locking mechanism;

d) said crank being mounted on said shaft with said one end of said crank beyond said annular land with respect to said end of said shaft;

e) said locking mechanism being mounted on said shaft over said land, said locking mechanism having a first rotative position in which said second protrusion is aligned with said flattened area to facilitate sliding of said locking mechanism axially along said shaft and a second rotative position in which said second protrusion is misaligned with said flattened area and located within said land to lock said locking mechanism and crank on said shaft; a threaded fastener received through said slot and into said second hole, said threaded fastener including an enlarged head received in said slot to lock said locking mechanism in said second rotative position.

18. The drive train of claim 17, further including a latch device received in said slot, said latch device including a third hole aligned with said slot and said threaded fastener received through said third hole within said slot and threadably received in said second hole.

19. The drive train of claim 18, wherein said latch device includes a first tang received in a groove in a crank arm of said crank.

20. The drive train of claim 19, wherein said latch device includes a second tang engaging a peripheral surface of said crank.

21. A quick release shaft coupling, comprising:
a) an elongated shaft having a generally circular cross-section, said shaft having a first end and a second end;
b) adjacent said first end of said shaft, said shaft having an annular land;
c) from said first end of said shaft to beyond said land with respect to said first end of said shaft, said shaft having a portion with a cross-section consisting of a circular section connected to a non-circular section, said non-circular section comprising a keyway intersecting said first end and said land;
d) an arm having a first end and a second end, said first end of said arm having an opening corresponding to said cross-section of said portion;
e) said opening of said arm being slidable over said portion of said shaft such that said arm is beyond at least some of said land with respect to said first end of said shaft; and
f) a coupling mechanism having an opening corresponding to said cross-section of said portion, said coupling mechanism being slidable over said portion of said shaft until its opening surrounds said land, whereupon said coupling mechanism may be rotated to lock said coupling mechanism to said land and preclude removal of said arm.

22. The quick release shaft coupling of claim 21, wherein said keyway is flat.

23. The quick release shaft coupling of claim 21, wherein said cross-section of said opening in said arm including a protrusion corresponding to a shape of said keyway.

24. The quick release shaft coupling of claim 21, wherein said cross-section of said opening in said coupling mechanism including a protrusion corresponding to a shape of said keyway.

25. The quick release shaft coupling of claim 21, wherein said coupling mechanism has a shape of a disc.

26. The quick release shaft coupling of claim 21, wherein said protrusion in said opening of said arm transmitting torque to said shaft via said keyway.

* * * * *